(12) United States Patent
Glenn

(10) Patent No.: US 7,520,360 B1
(45) Date of Patent: Apr. 21, 2009

(54) REAR SUSPENSION FOR MOTORCYCLE

(76) Inventor: Aaron L. Glenn, 109 S. Nelson Dr., Mustang, OK (US) 73064

( * ) Notice: Subject to any disclaimer, the term of this patent is extended or adjusted under 35 U.S.C. 154(b) by 197 days.

(21) Appl. No.: 11/787,320

(22) Filed: Apr. 16, 2007

Related U.S. Application Data

(63) Continuation-in-part of application No. 11/480,692, filed on Jul. 3, 2006.

(51) Int. Cl.
*B62K 11/00* (2006.01)
(52) U.S. Cl. .................... 180/227; 280/284; 280/288
(58) Field of Classification Search ............... 180/219, 180/227, 228, 230; 280/284, 288
See application file for complete search history.

(56) References Cited

U.S. PATENT DOCUMENTS

| | | | |
|---|---|---|---|
| 1,047,430 A | 12/1912 | Michaelson | |
| 4,556,119 A | 12/1985 | Shiratsuchi | |
| 4,706,774 A * | 11/1987 | Tsuboi | 180/227 |
| 5,062,495 A | 11/1991 | Padgell | |
| 5,469,930 A * | 11/1995 | Wiers | 180/227 |
| 6,161,858 A * | 12/2000 | Tseng | 280/281.1 |
| 6,481,523 B1 * | 11/2002 | Noro et al. | 180/227 |
| 6,595,310 B2 | 7/2003 | Gogo | |
| 6,823,958 B2 | 11/2004 | Domenicali | |

* cited by examiner

*Primary Examiner*—Lesley D Morris
*Assistant Examiner*—Marc A Scharich
(74) *Attorney, Agent, or Firm*—Randal D. Hamburg

(57) ABSTRACT

A rear motorcycle suspension for a motorcycle frame pivotally attaching to the rear portion of a motorcycle frame, having an air shock horizontally affixing an upper suspension arm of the rear suspension frame member to the motorcycle frame to absorb the upward vibrational movement and shock upon the rear wheel of the motorcycle without transfer to the motorcycle frame, the rear suspension frame member pivotally attaching between the frame components of the modified motorcycle frame.

3 Claims, 6 Drawing Sheets

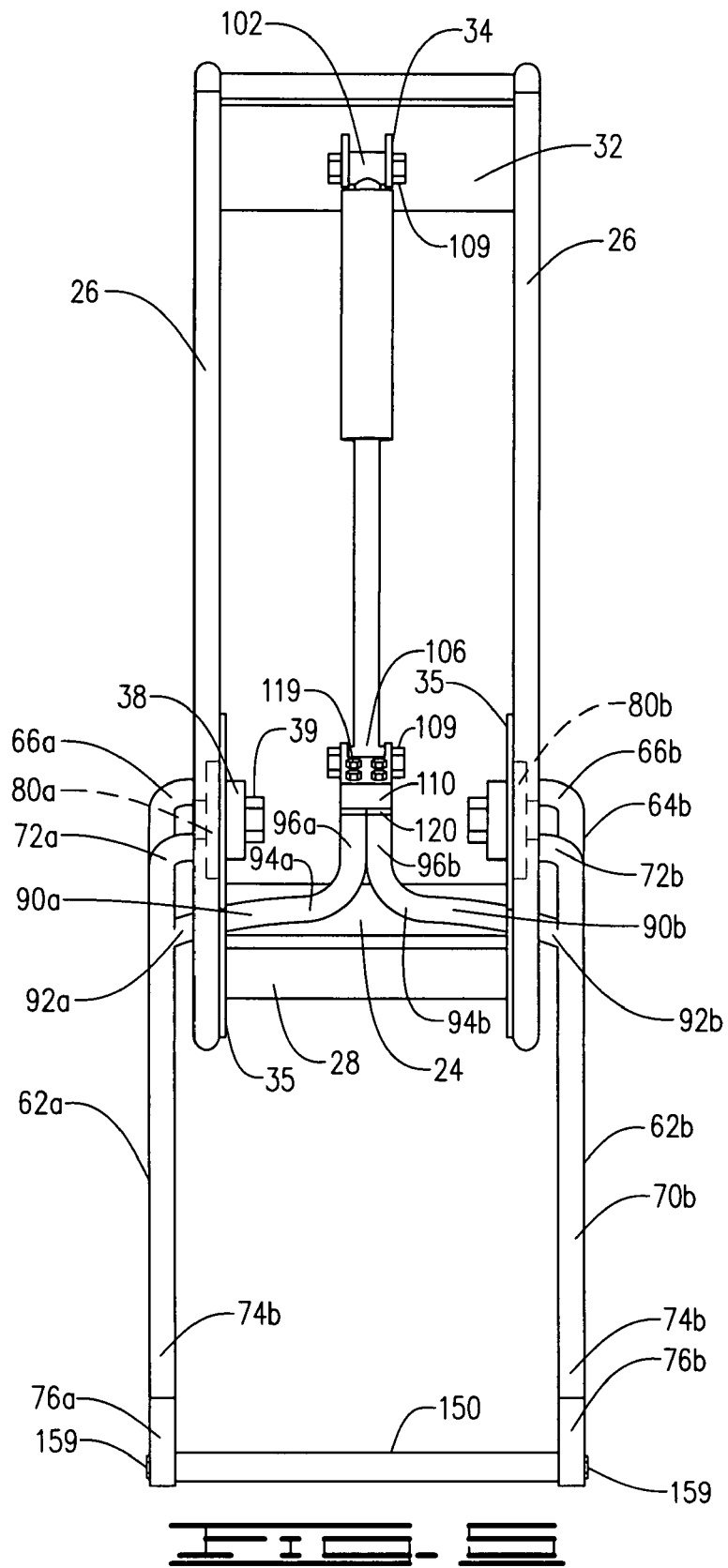

REAR SUSPENSION FOR MOTORCYCLE

CROSS REFERENCE TO RELATED APPLICATIONS

This is a Continuation-in-Part Utility Patent Application of U.S. patent application Ser. No. 11/480,692, filed on Jul. 3, 2006, by the same inventor, Aaron L. Glenn.

I. BACKGROUND OF THE INVENTION

1. Field of Invention

A rear motorcycle suspension for a motorcycle frame pivotally attaching to the rear portion of a motorcycle frame, having an air shock horizontally affixing an upper suspension arm of the rear suspension frame member to the motorcycle frame to absorb the upward vibrational movement and shock upon the rear wheel of the motorcycle without transfer to the motorcycle frame, the rear suspension frame member pivotally attaching between the frame components of the modified motorcycle frame.

2. Description of Prior Art

The following United States patents were discovered and are disclosed within this application for utility patent. All relate to motorcycle frame rear suspensions having a single shock absorbing means.

A vertically mounting shock absorber is disclosed in U.S. Pat. No. 1,0470,430 to Michaelson, which provides cushioning between rear frame components of motorcycles or bicycles. A similar vertical shock absorber is disclosed in U.S. Pat. No. 4,556,119 to Shiratsuchi, which provides for a single cushioning member between the pivot mechanism supporting a rear fork mechanism. U.S. Pat. No. 5,062,495 to Padgett, discloses yet another single vertical shock absorber between a movable swingarm retaining a rear drive wheel and the motorcycle frame. A swingarm suspension having a single cushion unit attached between a swingarm pivotally mounted to a pivot shaft provided on the side of a motorcycle body, the cushion unit including a suspension spring, an upper end and a lower end, the cushion unit being mounted to the swing arm, with the lower end of the cushion unit connected to the side of the motorcycle at a position below the pivot shaft. In U.S. Pat. No. 6,823,958 to Domenicali, a progressive suspension device on the rear wheel of a motorcycle having a single spring damper assembly.

The present rear suspension assembly for a motorcycle provides a swingarm having a lower end of a vertical suspension member attached to a first end of a horizontal support member at a junction elbow, the junction elbow pivotally attached to the rear portion of a motorcycle frame, the horizontal support member having a second end attached to a rear drive wheel of the motorcycle, and the vertical suspension member having an upper end pivotally attached to a first end of an air shock, the air shock placed in horizontal alignment with the motorcycle, with a second end of the air shock also pivotally attached to the rear portion of the motorcycle frame above attachment of the junction elbow, providing a vertical suspension of the rear suspension assembly along a horizontal axis.

II. SUMMARY OF THE INVENTION

The custom motorcycle manufacturing industry and a more diverse and broad ownership of custom motorcycles among a spectrum of enthusiasts choosing aesthetics over pure horsepower has become changed the demand in the motorcycle industry for a more sleek and artistic style of motorcycle. This is primarily due to the vast increased media exposure at the present time on several custom motorcycle television shows which appeal to the part-time motorcycle enthusiast who rides a motorcycle for pleasure. Custom motorcycle builders have created and extended motorcycle frames with lower integrated seats and expanded front forks on motorcycles, but little has changed with front and rear suspensions over the years. The typical motorcycle frame requires exposed rear vertical shocks on the rear portion of the frame to reduce the impact to the seat portion of the motorcycle which is visible from the outside of the motorcycle, commonly called a "softtail", or, in the absence of these rear shocks, is referred to as a "hardtail". These are provided either as a paired shock absorber or, as indicated in the above disclosed prior art, as a single shock absorber.

The rear suspension disclosed in the present motorcycle frame may be concealed underneath the seat or the rear frame of the motorcycle, with a single horizontal air shock instead of the single or dual vertically placed shocks in the current soft-tail motorcycle frames.

Thus, the primary objective of the present motorcycle suspension frame is to provide an air bag suspension device at the rear of a motorcycle frame mounted in a horizontal plane of the frame to reduce and dampen the vibrations and shock to the frame. A second objective is to provide an independent air bag suspension systems at the rear of a motorcycle frame where the air bag suspension device is not visibly mounted to reduce and dampen the vibrations and shock to the motorcycle. A third objective is to improve the efficiency of the suspension of the motorcycle frame while allowing for the motorcycle frame to extend in length and increase the potential length between the motorcycle frame and the drive wheel of the motorcycle. A fourth objective is to reduce the vertical stress placed upon the motorcycle frame and improve the efficiency of the motorcycle frame suspension for custom motorcycle builders. A fifth objective would be to improve the aesthetic presentation of a custom motorcycle by concealing the rear suspension components of the motorcycle frame behind other motorcycle components.

III. DESCRIPTION OF THE DRAWINGS

The following formal drawings are submitted with this utility patent application, but are not intended to represent scale drawings of the components of the rear suspension for motorcycles.

FIG. 5 is a lower view of the modified motorcycle frame and rear axle frame members.

FIG. 6 is an expanded perspective view of the modified motorcycle frame and rear axle frame members.

IV. DESCRIPTION OF THE PREFERRED EMBODIMENT

Figure 1:
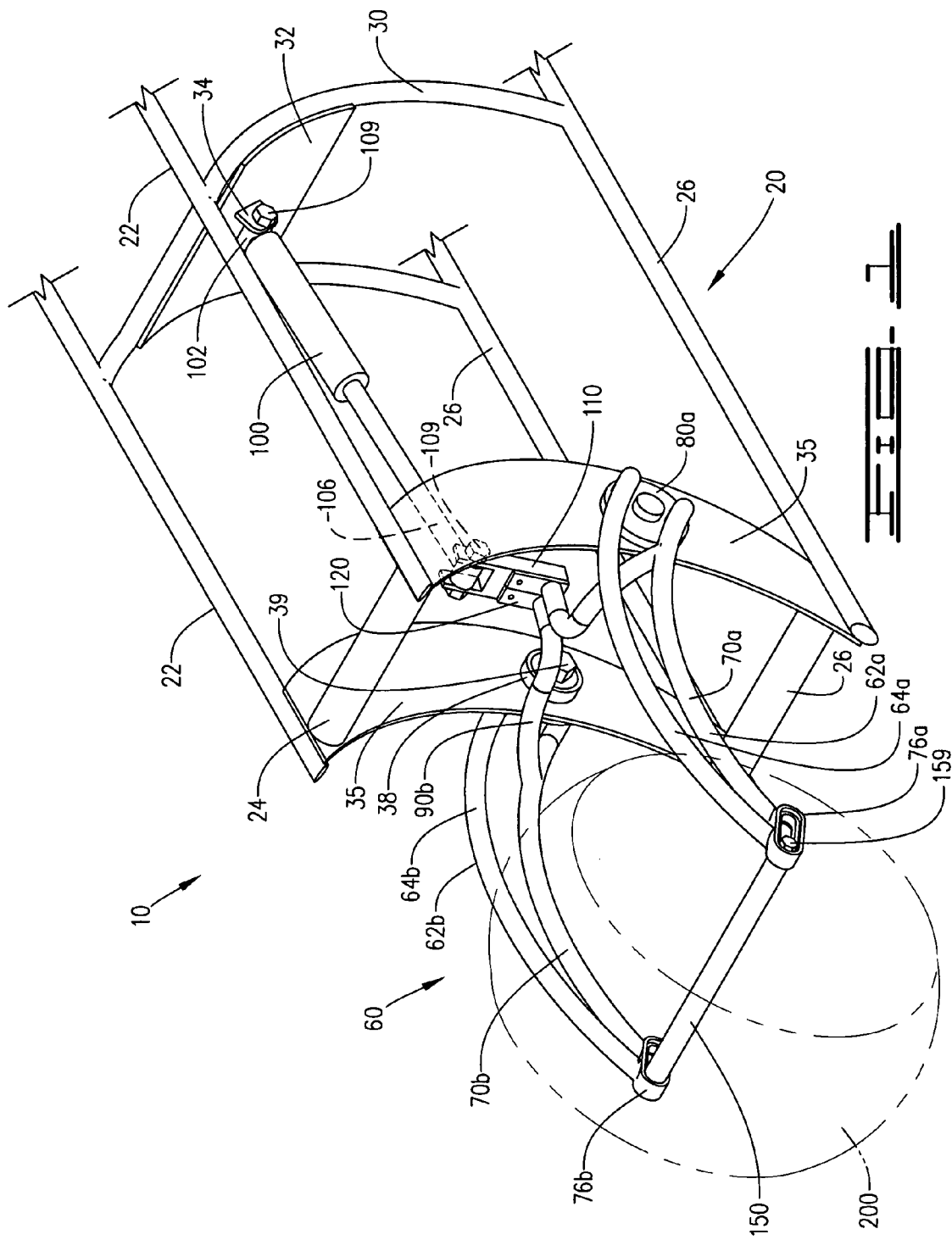
FIG. 1 is a perspective view of the modified rear motorcycle frame with the rear axle frame members and phantom lines indicating a rear tire.
Figure 2:
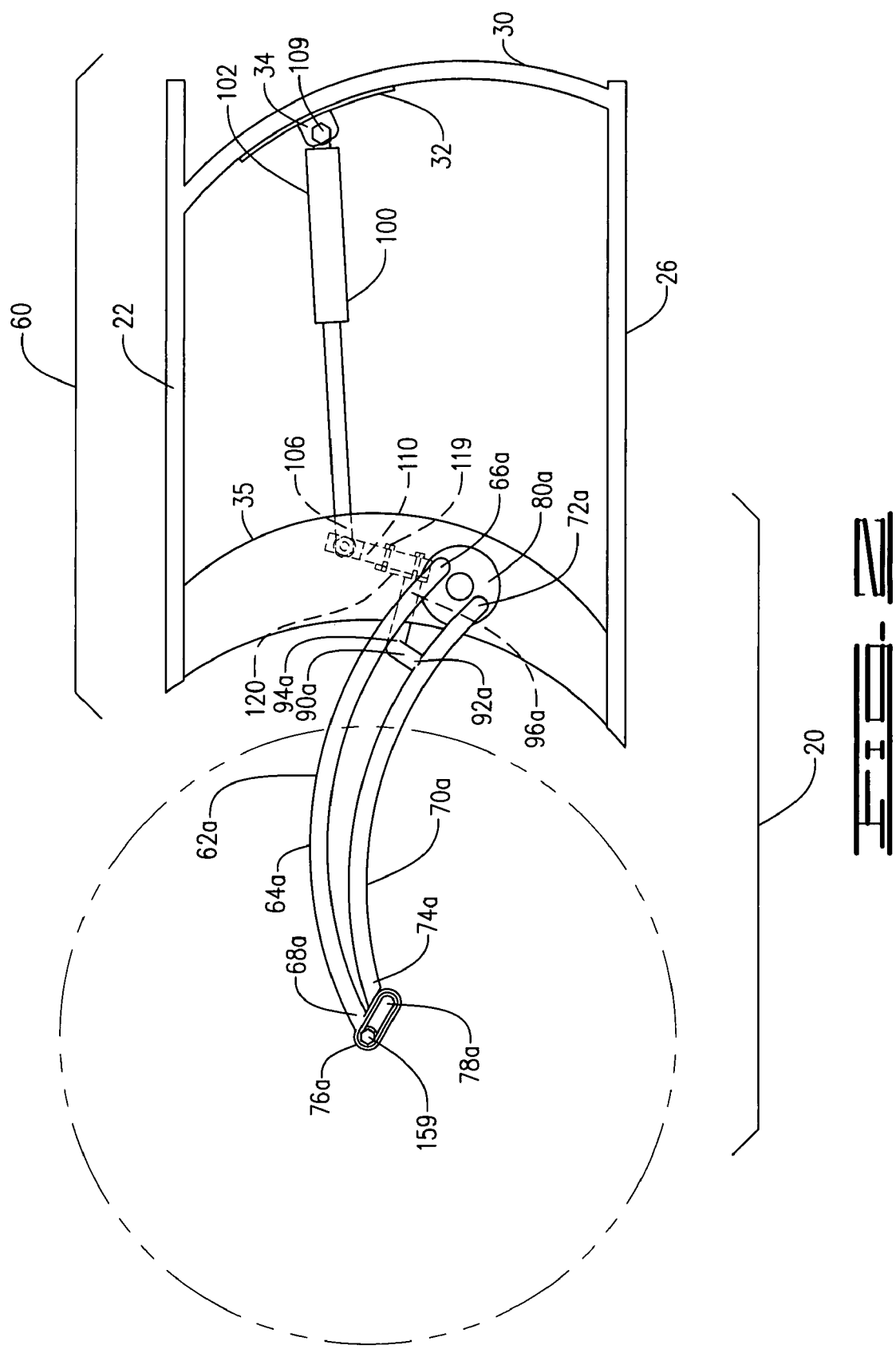
FIG. 2 is a side view of the modified rear motorcycle frame and rear axle frame member.
Figure 3:
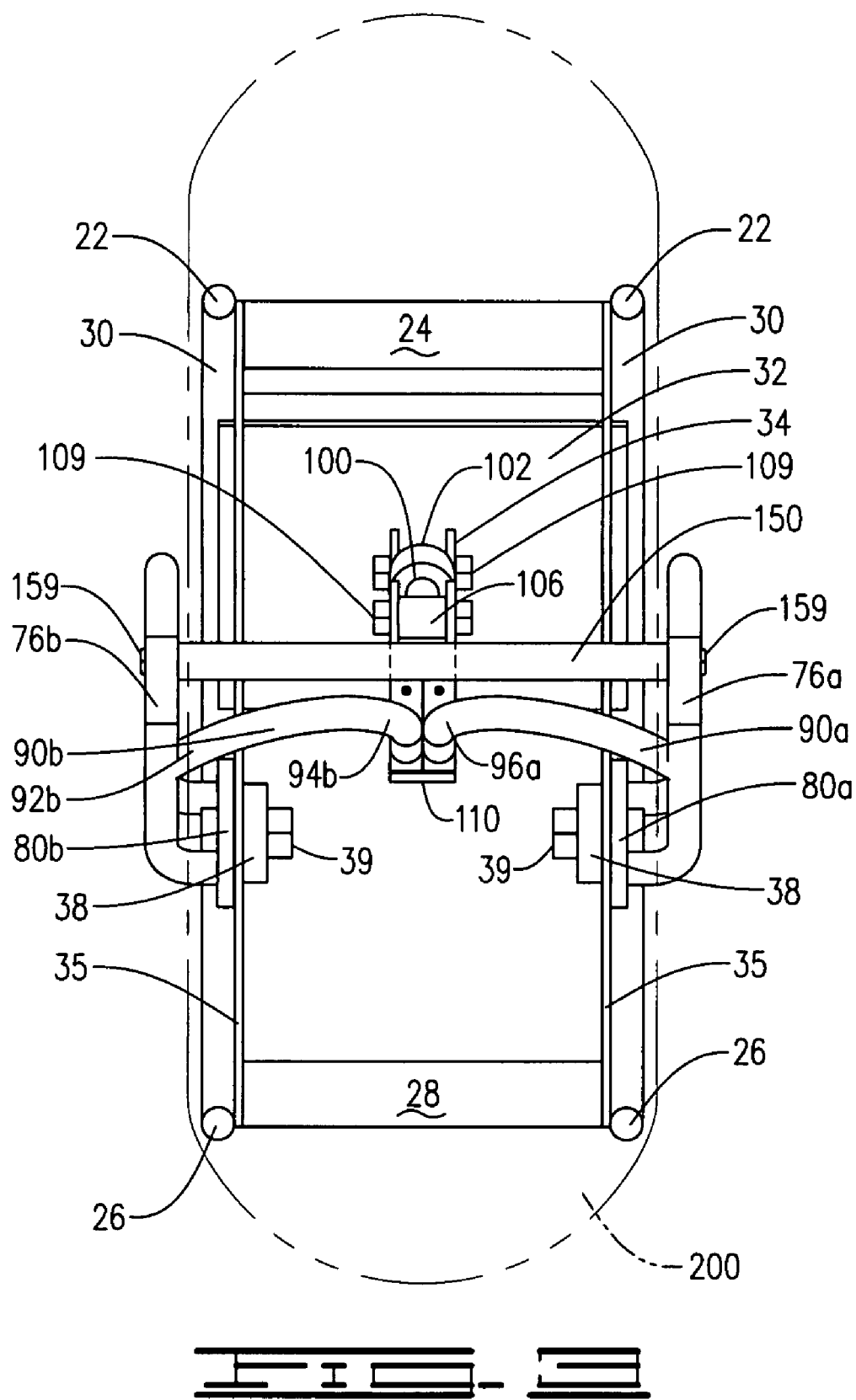
FIG. 3 is a rear view of the modified rear motorcycle frame and rear axle frame members.
Figure 4:
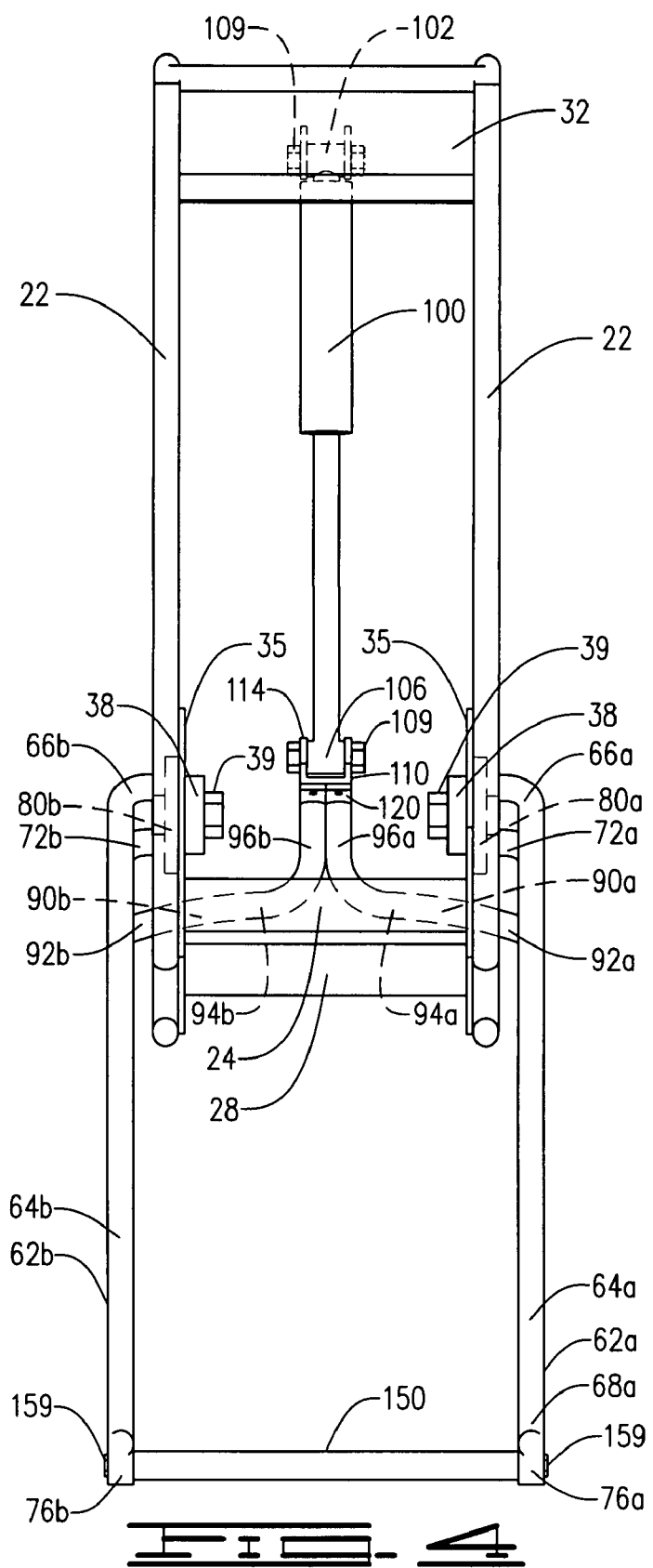
FIG. 4 is an upper view of the modified motorcycle frame and rear axle frame members.
Figure 8:
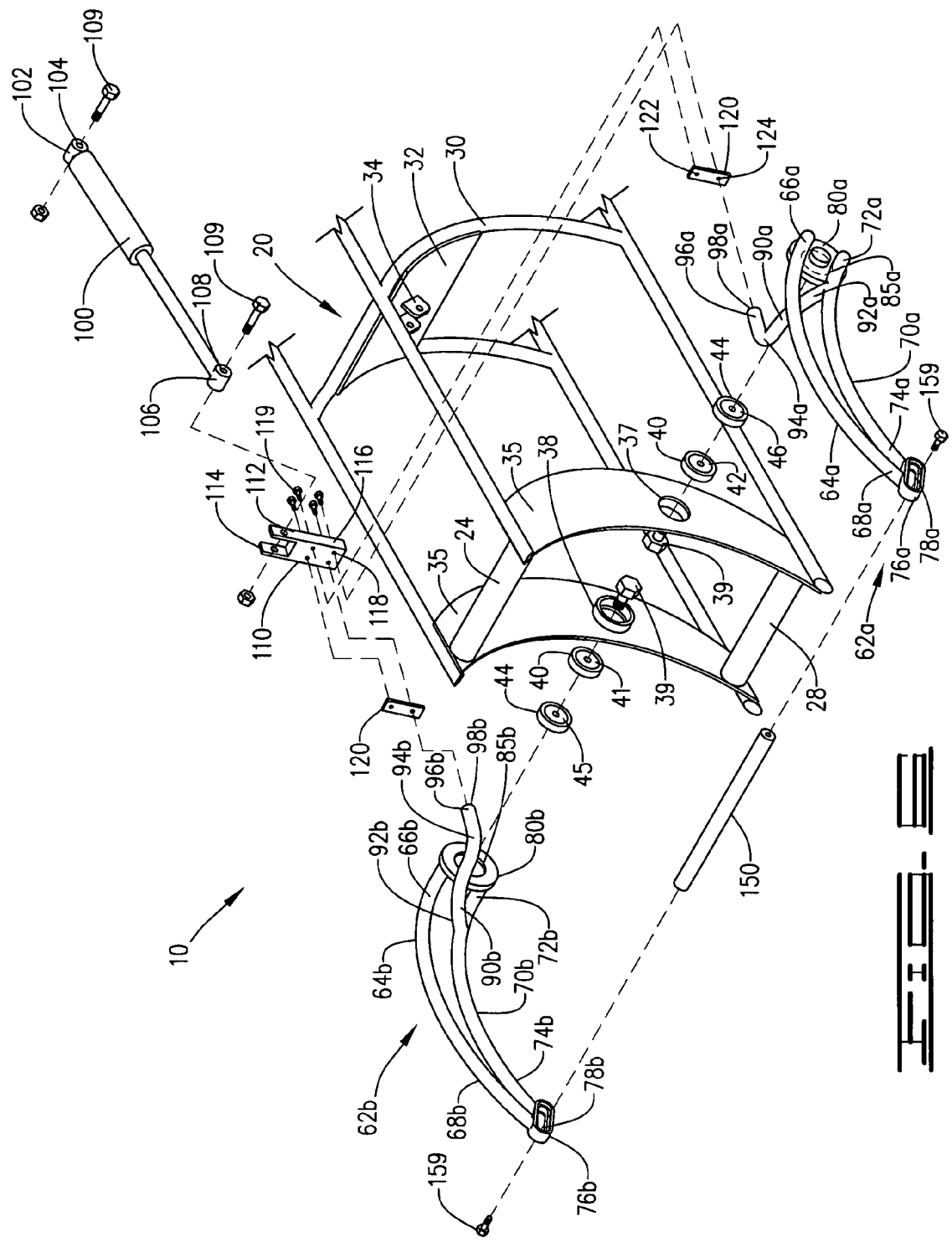

An improved motorcycle rear suspension 10 providing a horizontal air bag suspension mechanism 100, adapted to a modified rear portion of a motorcycle frame 20, disclosed in FIGS. 1-6 of the drawings, comprises said rear portion of a motorcycle frame 20 having two upper rear backbone tubes 22, two lower frame rails 26, an upper cross frame member 24 attaching the two upper rear backbone tubes 22, a lower cross frame member 28 attaching the two lower frame rails 26, two intermediary upright support components 30 each connecting a respective upper backbone tube 22 and a lower frame rail 26 and two rear upright frame members 35 each connecting a respective backbone tube 22 and a lower frame rail 26, the two intermediary upright support components 30 attaching an upper air bag suspension mounting plate 32 defining a pair of plate bracket flanges 34 and each rear upright frame member 35 defining an axially aligned axle frame disk bore 37 with an inner seat ring 39. A rear suspension assembly 60 further comprises a first rear axle frame member 62a and a second rear axle frame member 62b, pivotally connecting to the axle frame disk bores 37 by an inner pivot disk 40, an outer pivot disk 44 and a support arm bolt 39. The first and second rear axle frame members 62a, 62b are joined together and connected to a transfer channel bracket 110 which is pivotally attached to a rear segment 106 of said air bag suspension mechanism 100, with a front segment 102 of the air bag suspension mechanism 100 pivotally attaching to the plate bracket flanges 34 of the upper air bag suspension mounting plate 32 attaching to the intermediary upright support component 30, the air bag suspension mechanism 100 compressing and expanding under pressure providing a horizontal suspension of the first and second rear axle frame members 62a, 62b. A rear axle 150 upon which a motorcycle wheel 200, FIGS. 1-3, is applied, is attached to the rear suspension assembly 60 by axle bolts 159, FIGS. 1 and 3-6.

As further indicated in FIGS. 1 and 4-6, each first and second rear axle frame member 62a, 62b further comprises an upper arm member 64a, 64b having a first end 66a, 66b and a second end 68a, 68b, a lower arm member 70a, 70b having a first end 72a, 72b and a second end 74a, 74b, a rear axle plate 76a, 76b defining an axle bolt channel aperture 78a, 78b attaching the second ends 68a, 68b, 74a, 74b of each upper and lower arm members 64a, 64b, 70a, 70b, a front connecting plate 80a, 80b defining an inner arm bolt bore 85a, 85b, the front connecting plate 80a, 80b attaching the first ends 66a, 66b, 72a, 72b of each upper and lower arm member 64a, 64b, 70a, 70b, an inner arm member 90a, 90b defining a rear end 92a, 92b extending inward from the lower arm member 70a, 70b, the inner arm member 90a, 90b also defining an upward directed transitional neck portion 94a, 94b, FIG. 3, terminating into a front neck extension 96a, 96b defining an internally threaded plate blot bore 98a, 98b.

A neck extension mounting plate 120, FIGS. 1 and 6, having an upper mounting hole 122 and a lower mounting hole 124, is attached to a lower portion 116 of the transfer channel bracket through a plurality of arm mounting plate holes 118 by a plurality of plate bolts 119 attaching through an arm mounting plate hole 118, through the lower mounting hole 124 of each neck extension mounting plate 120 into the respective threaded plate bolt bore 98a, 98b, while another plate bolt 119 is attached through an arm mounting plate hole 118 and through the upper mounting hole 122 of the neck extension mounting plate 120.

The transfer channel bracket 110, FIGS. 1 and 6, would also include an upper portion 112 defining a pair of air bag connector flanges 114 to which a rear bore 108 of the rear segment 106 of the air bag suspension mechanism 100 is attached by an air bag bolt 109, while a front bore 104 of the front segment 102 of the air bag suspension mechanism 100 is attached to the plate bracket flanges 34 of the air bag suspension mounting plate 32, whereby the upward movement of said rear suspension assembly 60 would horizontally compress the air bag suspension mechanism 100 while downward movement of said rear suspension assembly 60 would horizontally extend the air bag suspension mechanism 100.

Each inner pivot disk 40 and outer pivot disk 44, FIG. 6, further define the inner pivot disk 40 adapted to be contained within each frame disk bore 37 and each inner seat ring 38 and defining an inner surface 41 and a friction reducing outer surface 42 and each outer pivot disk 44 also adapted to be contained within each frame disk bore 37 and each inner sear ring 38 and defining an outer surface 46 and a friction reducing inner surface 45, the inner surface 45 of the outer pivot disk 44 and the outer surface 42 of the inner pivot disk 40 in contact with each other when contained within the inner seat ring 38, allowing for a friction resisting pivotal movement between each inner and outer pivot disks 40, 44 attached to the front connecting plate 80a, 80b of each first and second rear axle frame member 62a, 62b by each secured support arm bolt 39.

As further option, though not indicated in the drawing figures, the air bag suspension mechanism 100 could be replaced by a horizontally mounted hydraulic shock or a tension spring mechanism which would serve the same purpose. The first and second rear axle frame members 62a, 62b may also have aesthetic modifications not affecting function, including an outer shield plate attached to each upper arm member and lower arm member for a more sleek finish and presentation, also not shown in the drawing figures. Also the modifications to the rear portion of the motorcycle frame 20 are not intended to result in any modification to the front portion of the motorcycle, thereby avoiding any limitation to the front portion of the motorcycle frame to include any existing prior art or any subsequently evolved new art which might be developed subsequent to the filing of this disclosure.

While the invention has been particularly shown and described with reference to a preferred embodiment thereof, it will be understood by those skilled in the art that changes in form and detail may be made therein without departing from the spirit and scope of the invention.

What is claimed is:

1. An improved motorcycle rear suspension providing a horizontal air bag suspension mechanism, adapted to a modified rear portion of a motorcycle frame comprising:

said rear portion of a motorcycle frame having two upper rear backbone tubes, two lower frame rails, an upper cross frame member attaching said two upper rear backbone tubes, a lower cross frame member attaching said two lower frame rails, two intermediary upright support components each connecting a respective upper backbone tube and a lower frame rail and two rear upright frame members each connecting a respective backbone tube and a lower frame rail, said two intermediary upright support components attaching an upper air bag suspension mounting plate defining a pair of plate bracket flanges and each rear upright frame member defining an axially aligned axle frame disk bore with an inner seat ring;

a rear suspension assembly comprising a first rear axle frame member and a second rear axle frame member, pivotally connecting to said axle frame disk bores by a respective inner pivot disk, an outer pivot disk and a support arm bolt, said first and second rear axle frame members are joined together and connected to a transfer channel bracket which is pivotally attached to a rear segment of said air bag suspension mechanism, with a front segment of said air bag suspension mechanism pivotally attaching to said plate bracket flanges of said upper air bag suspension mounting plate attaching to said intermediary upright support component, said air bag suspension mechanism compressing and expanding under pressure providing a horizontal suspension of said first and second rear axle frame members; and a rear axle upon which a motorcycle wheel is applied, attached to said rear motorcycle suspension by axle bolts.

2. The rear motorcycle suspension as disclosed in claim 1, wherein each said first and second rear axle frame member further comprises:

an upper arm member having a first end and a second end;

a lower arm member having a first end and a second end;

a rear axle plate defining an axle bolt channel aperture attaching said second ends of each upper and lower arm members within which said axle containing said motorcycle wheel is attached;

a front connecting plate defining an inner arm bolt bore, said front connecting plate attaching each said first ends of each upper and lower arm member;

an inner arm member defining a rear axle end extending inward from said lower arm member, said inner arm member also defining an upwardly directed transitional neck portion terminating into a front neck extension defining an internally threaded plate blot bore;

a neck extension mounting plate attached to said transfer channel bracket; and said transfer channel bracket further including an upper portion pivotally attached to said rear segment of said air bag suspension mechanism while said front segment of said air bag suspension mechanism is pivotally attached to said plate bracket flanges of said air bag suspension mounting plate, whereby an upward movement of said motorcycle wheel attached to said rear suspension assembly would horizontally compress said air bag suspension mechanism while a downward movement of said motorcycle wheel attached to said rear suspension assembly would horizontally extend said air bag suspension mechanism.

3. The rear motorcycle suspension as disclosed in claim 1, wherein each said first and second rear axle flame member further comprises:

an upper arm member having a first end and a second end;

a lower arm member having a first end and a second end;

a rear axle plate defining an axle bolt channel aperture attaching said second ends of each upper and lower arm members within which said axle containing said motorcycle wheel is adjustably attached by axle bolts;

a front connecting plate defining an inner arm bolt bore, said front connecting plate attaching each said first ends of each upper and lower arm member;

an inner arm member defining a rear axle end extending inward from said upper arm member, said inner arm member also defining an upwardly directed transitional neck portion terminating into a front neck extension defining an internally threaded plate blot bore;

a neck extension mounting plate having an upper mounting hole and a lower mounting hole, attached to a lower portion of said transfer channel bracket through a plurality of arm mounting plate holes by a plate bolt attaching through an arm mounting plate hole, through said lower mounting hole of one of each said neck extension mounting plates into said respective threaded plate bolt bore, while another plate bolt is attached through an arm mounting plate hole and through said upper mounting hole of said neck extension mounting plate; and said transfer channel bracket further including an upper portion defining a pair of air bag connector flanges to which a rear bore of said rear segment of said air bag suspension mechanism is attached by an air bag bolt, while a front bore of said front segment of said air bag suspension mechanism is attached to said plate bracket flanges of said air bag suspension mounting plate by an air bag bolt, whereby an upward movement of said motorcycle wheel attached to said rear suspension assembly would horizontally compress said air bag suspension mechanism while a downward movement of said motorcycle wheel attached to said rear suspension assembly would horizontally extend said air bag suspension mechanism.

* * * * *